United States Patent [19]

De Beaucourt et al.

[11] Patent Number: 5,421,426

[45] Date of Patent: Jun. 6, 1995

[54] WALKING ROBOT FOOT

[75] Inventors: Philippe De Beaucourt; Philippe Garrec, both of Paris; Philippe Morganti, Etampes; Didier Sabourin, Alfortville, all of France

[73] Assignee: Commissariat a L'Energie Atomique, Paris, France

[21] Appl. No.: 138,915

[22] Filed: Oct. 18, 1993

[30] Foreign Application Priority Data

Nov. 5, 1992 [FR] France ................ 92 13326

[51] Int. Cl.⁶ .................................. B62D 57/032
[52] U.S. Cl. ................................... 180/8.1; 180/8.6; 623/53; 623/54; 623/55
[58] Field of Search ............. 180/8.1, 8.6; 623/53, 623/54, 55

[56] References Cited

U.S. PATENT DOCUMENTS

| | | | |
|---|---|---|---|
| 5,151,859 | 9/1992 | Yoshino et al. | 180/8.6 |
| 5,219,410 | 6/1993 | Garrec | 180/8.1 |
| 5,255,753 | 10/1993 | Nishikawa et al. | 180/8.6 |

FOREIGN PATENT DOCUMENTS

| | | |
|---|---|---|
| 0406018 | 1/1991 | European Pat. Off. |
| 0433091 | 6/1991 | European Pat. Off. |
| 379528 | 11/1907 | France |
| 2653516 | 4/1991 | France |

OTHER PUBLICATIONS

Shigeo Hirose, "A Study of Design and Control of a Quadruped Walking Vehicle", 1984, The International Journal of Robotics Research, vol. 3, No. 2.

*Primary Examiner*—Mitchell J. Hill
*Attorney, Agent, or Firm*—Hayes, Soloway, Hennessey, Grossman, & Hage

[57] ABSTRACT

An artificial foot for a robot as a separate planar base plate, the foot being supported from a robot leg by a swivel joint. The inclination of the base plate and foot with respect to the leg can be measured as well as movement of the base plate with respect to the foot.

10 Claims, 1 Drawing Sheet

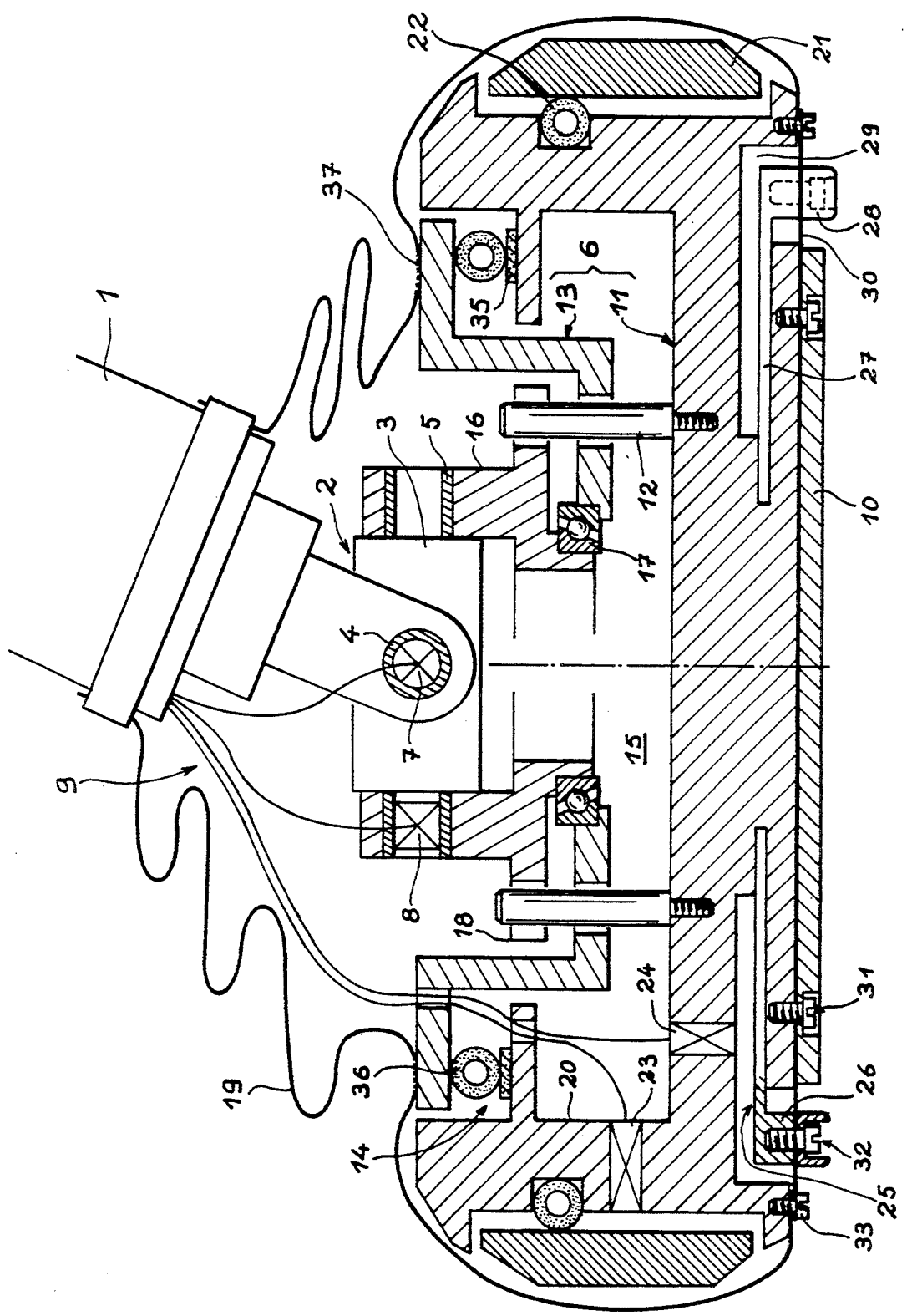

WALKING ROBOT FOOT

DESCRIPTION

The invention relates to a walking robot foot.

Certain mobile robots travel over the ground in the same way as numerous living beings, by bearing on members which perform alternate forward and rearward movements during which the feet are alternately placed on the ground and raised.

An important problem encountered with such robots is that the quality of the bearing action of the foot on the ground can often not be forecast, which can give rise to a lack of equilibrium and to the falling of the robot, if e.g. the foot slips on an excessively inclined object or on a mobile object placed on the ground, if the contact is produced on an inadequately large surface area which gives way as soon as the robot weight is applied, or if the support only exists on an offcentered portion of the foot, which then tips or tilts.

The traditional sensors used for detecting the environment of the robot by an artificial vision or a process of the same type have problems in distinguishing certain categories of obstacles and the like, particularly level changes such as staircase steps, certain small objects placed on the ground and surfaces in the form of gratings. They are also complicated and expensive to put into use and can easily be deteriorated, e.g. by crushing. They are consequently relatively unreliable in numerous circumstances and in particular if the robot has to cover long distances among industrial installations.

The walking robot foot according to the invention incorporates a fitting provided with a planar base plate for bearing or supporting on the ground, a swivel joint between the fitting and another part of the robot and which is designed so as to authorize orientation of the base plate in all directions, base plate inclination sensors, ground contact sensors located alongside the base plate and substantially in its plane, the fitting being designed in two parts connected by a spring for absorbing the compression energy of the foot produced by the other part of the robot, one of the parts of the fitting carrying the swivel joint and the other of the parts of the fitting carrying the base plate and the contact sensors.

The combination of these means makes it possible to obviate the aforementioned problems. The base plate is itself positioned with the local orientation of the ground, but the inclination sensors may prevent any bearing action if the inclination is excessive for excluding slipping. The contact sensor makes it possible to check if bearing is produced on an adequate surface, which is sufficiently firm. Finally, the subdivision of the fitting into two parts connected by springs makes it possible to not immediately apply all the bearing force, which leaves time necessary for checking the quality of the support and optionally raise the foot in order to attempt to place it elsewhere.

The contact sensors are advantageously retractile bearings connected to the fitting by springs. The detection of their displacement makes it possible to unambiguously check the contact.

The fitting can be completed by a lateral border which surrounds the base plate and which is mobile so that it deforms as soon as it touches a lateral object, which indicates that it is preferable to move the foot away.

The invention will now be described in greater detail relative to the single drawing, which illustrates a longitudinal sectional view of a foot according to the invention.

The foot is joined to the lower end of a robot leg 1, which is not shown, but is similar to that of French Patent 2 653 516, by a swivel joint 2, formed from a mobile cage 3, from which emanates a transverse shaft 4 fixed to the leg 1 and a longitudinal shaft 5 fixed to the top of a fitting 6 of the foot. The shafts 4 and 5 are hollow and in each case protect an angular sensor 7 or 8, which makes it possible to measure their rotation. Like the other sensors to be described hereinafter, the sensors 7 and 8 are connected to the robot control system by wires 9 running along the leg 1. If the leg 1 is displaced without its inclination ever changing, it is possible to immediately know the inclination of the foot and in particular of a planar, horizontal, ground supporting base plate 10, which belongs to the same and which is fixed to the bottom surface of a lower part 11 of the fitting 6. Otherwise the inclination of the base plate 10 can be calculated by knowing the inclination of the leg 1.

Vertical guidance columns or posts 12 rise from the top surface of said lower part 11 and pass through openings made in an upper part 13 of the fitting 6, which carries the swivel joint 2 and enable the upper part 13 to slide vertically with respect to the other part. A spring 14 is located in a cavity 15 between the parts 11 and 13 of the fitting 6. When the leg 1 is lowered, it is compressed as soon as the base plate 10 touches the ground and until it transmits all that part of the robot weight which bears on the foot.

The spring 14 is not a conventional metallic spring, but a system constituted by a circular rubber band 35 bonded to the lower part 11 and a looped silicone pipe 13 crushed between the rubber band 35 and the upper part 13, to which it is bonded. The silicone pipe 36 is ovalized with a limited, uniform stiffness when it is compressed and until it is completely crushed, after which the spring 14 only has the considerable stiffness elasticity of the rubber band 35. The system is sufficiently flexible to enable it to set down the foot well before the total application of the force, so as to be able to anticipate incorrect or hazardous bearing effects, but is sufficiently rigid to no longer produce a major compression when the force starts to be applied. In addition, the silicone pipe 36 has the major advantage of straightening without producing significant vibrations when it is relaxed, i.e. when there is a strong damping. Finally, the undesirable, horizontal translation movements of the two parts 11 and 13 of the fitting 6 are virtually impossible, because the spring 14 is very rigid with respect to such movements.

The upper part 13 of the fitting 6 has a pivot 16 carrying the swivel joint 2, connected to the remainder by a bearing 17 rotating about a vertical axis and which consequently enables the base plate 10 to rotate, whilst still remaining in an invariable plane determined by the movements of the swivel joint 2. It is then useful to provide the pivot 16 with abutments 18, which touch certain of the posts 12 in order to limit rotation and not pull out the sensor wires, or deteriorate the sleeve 19 advantageously used for enveloping most of the foot, with the exception of its lower surface. The upper edge of the sleeve 19 is crimped around the leg 1. It is made from an elastic material and twists as soon as there is a pivoting of the base plate 10, but it brings the foot into a privileged position when it is raised. It is also useful for protecting the mechanisms of the foot against shocks and dirtying. In order to relieve the lower part of the sleeve 19, a supplementary crimping is provided at the top of the fitting 6 on a circular bearing surface 37.

The lower part 11 of the fitting 6 comprises a border 20 around the upper part 13 and which carries a continuous or discontinuous ring 21 surrounding it, as well as the base plate 10 and which the sleeve 19 insulates from the outside. The ring 21 is mounted on the border 20 by means of a spring 22, which can here again be a flexible pipe wound around the border 20. The ring 21 is also freely mobile around the border 20. It is preferable for its friction action on the spring 22 to be reduced, which is the case if it is made from aluminium and the spring 22 is made from vinyl. Displacement sensors or transducers 23 are arranged in ring-like manner on the border 20 and measure the displacements of the ring 21, which occur as soon as it touches lateral obstacles, which are then in this way indicated to the robot control system.

Other displacement transducers 24 are inserted in the lower part 11, in front of the contact sensors 24 essentially constituted by a bearing 26 mounted on an elastic strip 27, whose opposite end is embedded in the lower part 11. The bearings 26 are terminated by a base block 28, which extends slightly below the base plate 10 and must generally touch the ground when the latter is placed thereon. The base block 28 and the bearing 26 are then pushed back and the strip 27 is bent. These displacements are noted by the displacement transducers 24 and indicated to the robot control system. The bearings 26 are placed alongside the base plate 10, i.e. around the latter or optionally in cavities therein. The bearing of the foot on the ground is interrupted by the control system and the foot is displaced if insufficient sensors or transducers are displaced, because this generally means that the base plate 10 is only touching the ground over an excessively small surface, or an object placed on the ground.

The bearings 26 and the strips 27 are located in cavities 29 of the lower part 11, which are advantageously covered by a flexible protection sheet 30 ensuring the necessary sealing and optionally common to all the cavities 29, so that they extend over virtually the entire lower surface of the fitting 6. It then has a portion covered by the base plate 10, which engages against the lower part 11 by means of fastening screws 31. In the same way, portions of the flexible sheet 30 are fixed between the bearings 26 and the base blocks 28 by fastening screws 32 of the latter, so that the blocks 28 can be replaced at random when they become used.

Screws 33, rivets or any other random means can be used for fixing the flexible sheet 30 and the sleeve 19 to the fitting. The periphery of the cavities 29 is advantageously provided with a rounded edge, which does not risk cutting the flexible sheet 30 when the bearings 26 are retracted.

The presently described foot provides all the necessary safety guarantees and is usable for virtually all ground surfaces.

The displacement transducers 23,24 can be inductive, optical, magnetic, etc., or can be constituted by potentiometers or precision microswitches, i.e. with or without material contact.

We claim:

1. An artificial foot for a robot walking on a ground, comprising a body (6) having a planar base plate (10) for bearing on the ground, a swivel joint (2) for linking the body to an attachment part (1) of the robot, the swivel joint (2) allowing for inclination of the body and the base plate in a plurality of directions, sensors (7, 8) for measuring an orientation of the body and base plate imparted by said inclination, contact sensors (25) around the base plate and substantially coplanar with the base plate, the body consisting of an upper part (14) bearing the swivel joint and a lower part (13) bearing the base plate and contact sensors, and a spring system connecting the upper and lower parts together and designed to absorb compression energy imparted to the foot when the foot contacts the ground.

2. An artificial foot according to claim 1, wherein the spring system comprises a first member of uniform, limited stiffness and a second member having a greater and variable stiffness operatively connected to the first member.

3. An artificial foot according to claim 1, wherein the contact sensors (25) comprise pads (26) connected to the body by springs (27) and that project under the base plate when the foot is raised over the ground and are pushed up when the foot contacts the ground.

4. An artificial foot according to claim 3, wherein the body comprises cavities (29) into which the pads are pushed up, a flexible protective sheet (30) covering the cavities (29).

5. An artificial foot according to claim 4 wherein there is a single sheet (30) for all the cavities, and a central part of the sheet is sandwiched between the body and the base plate.

6. An artificial foot according to claim 3, wherein the pads comprise a lower dismantable cushion (28).

7. An artificial foot according to claim 1, wherein the body bears a lateral border (21) surrounding the body and connected to the body through a spring (22) allowing for lateral displacements of the border, sensors (23) being provided to detect said lateral displacements.

8. An artificial foot according to claim 1, comprising a pivoting articulation (17) allowing for rotations of the base place (10) with respect to the attachment part about a vertical axis, and a means (19) for biasing the base plate to a normal position with respect to the attachment part.

9. An artificial foot according to claim 8, wherein the biasing means consists in a resilient sleeve (19) in which the foot is wrapped except for the base plate and the contact sensors, the sleeve being clamped on the attachment part (1).

10. An artificial foot according to claim 1, wherein the upper and lower parts are connected by sliding guiding posts (12).

* * * * *